United States Patent [19]
Noble

[11] 3,888,183
[45] June 10, 1975

[54] CONTROL SYSTEM FOR SUPPRESSING WHEEL SQUEALING NOISE PRODUCED BY RAILROAD CAR RETARDERS

[75] Inventor: Peter M. Noble, Valencia, Pa.
[73] Assignee: Westinghouse Air Brake Company, Swissvale, Pa.
[22] Filed: June 28, 1974
[21] Appl. No.: 484,140

[52] U.S. Cl. ............................ 104/26 A; 246/169 S
[51] Int. Cl. ............................................. B61b 1/00
[58] Field of Search ...... 246/182 BH, 182 A, 169 S; 104/26 A; 188/38, 41, 45

[56] References Cited
UNITED STATES PATENTS
3,240,930   3/1966   Porter ............................ 246/169 S Primary Examiner—M. Henson Wood, Jr.
Assistant Examiner—D. W. Keen
Attorney, Agent, or Firm—J. B. Sotak; R. W. McIntire, Jr.

[57] ABSTRACT

This disclosure relates to a control system for suppressing wheel squealing noises produced by an activated frictional type of fluid pressure operated railroad car retarder. A microphonic transducer is disposed in the immediate vicinity of the car retarder for picking up and converting the sound wave pressures into alternating current signals. A band-pass filter network is arranged to pass a select band of frequencies of the alternating current signals. A diode rectifier converts the passed alternating current signals into a d.c. voltage. An integrating circuit produces an output signal which is substantially the time integral of the d.c. input voltage. An operational amplifier compares the output signal of the integrating circuit with an input reference signal and produces an output signal when the output signal is greater than the input reference signal. The output signal drives a power amplifier for causing the energization of an electromagnetic exhaust valve which deactivates the car retarder.

11 Claims, 3 Drawing Figures

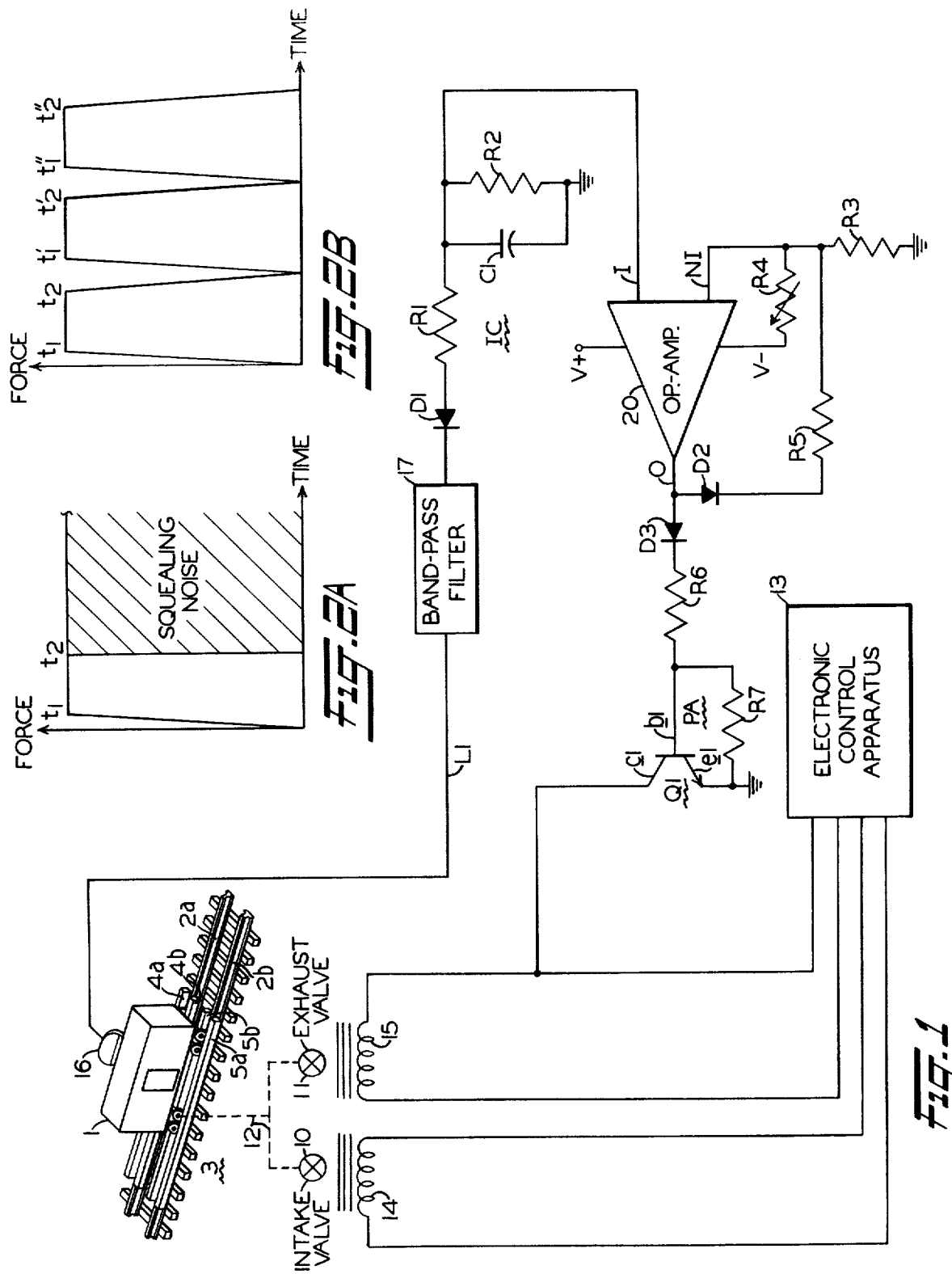

3,888,183

CONTROL SYSTEM FOR SUPPRESSING WHEEL SQUEALING NOISE PRODUCED BY RAILROAD CAR RETARDERS

SUBJECT OF THE INVENTION

This invention relates to a pollution control arrangement for suppressing acutely disturbing and possibly injurious noises produced by braking apparatus and, more particularly, to a novel system for controlling wheel squealing sounds emanating from an activated frictional type of railroad car retarder by selectively releasing the braking effort exerted on the wheels of a railroad vehicle by deactivating the car retarder when the applied energy approaches or exceeds an audible noise producing level.

BACKGROUND OF THE INVENTION

In hump type of railroad classification yards, it is conventional to employ wheel engaging car retarders at both master and group locations to control the leaving speeds of the moving railway cars or vehicles. The car retarders which grip the opposite sides of the car wheels often cause extremely loud and piercing squealing noises to be generated in the vicinity. These high pitched screeching sounds are annoying or irritating and painful. In some cases, long-term exposure to sounds above a critical level can result in the loss of hearing of individuals, such as, yard workmen who continually work in the area or other personnel who repeatedly occasion the area. These acute and detrimental sound waves are produced by the stick-slip or grating action which takes place between the wheels of the moving cars and the contacting surfaces of the brake shoes of the actuated car retarders. In practice, it has been found that the most troublesome pitch or frequency range of the generated sound waves lies between 2,000 to 4,000 hertz and that the level or loudness of the noises may exceed a 130 decibels (db) or more at a distance of 8 feet or less. Otolarynologists, audiologists and other qualified experts have found that human beings experience pain and discomfort at noise levels of 120 db or more and that repeated exposure to such high levels of noise can eventually result in hearing losses. While there have been numerous suggestions and proposals to eliminate and mitigate the noise pollution produced by railroad car retarders, each of these previous attempts includes one or more shortcomings which have precluded industry-wide acceptance. Previous endeavors, such as, replacing steel brake shoes with ductile iron or providing a lubricant on the engaging surfaces of the brake shoes and wheels of the car have not proven totally effective in eliminating wheel squeal. The use of ductile iron shoes in place of the presently employed steel shoes is feasible but uneconomical since ductile iron shoes wear 4 times as fast as steel. Thus, a car retarder equipped with ductile iron shoes normally requires 4 times as many shoe replacements and proportionally needs as many adjustments as an all-steel car shoe retarder. The use of lubricants, such as, oils or oil mixtures which are sprayed or applied to the contacting surfaces for preventing wheel squeal is also possessed of several disadvantages. The employment of lubricants on the brake shoes and wheels not only materially reduces effective braking length of the retarder but also dramatically increases the initial purchase price as well as the subsequent maintenance costs of the car retarder. Another deleterious effect of using lubricants is the pollution problem created in the immediate area of the retarder as well as in the entire yard due to oil dropping from the railway cars as they freely move to their respective destinations. An alternative attempted method of resolving the noise problem has been the erection of barriers or walls along the respective sides of the railroad car retarder. Previous proposed noise barriers employing porous types of noise absorption materials were unacceptable in that they soon become relatively ineffective in suppressing the noise produced by the car retarder. The salient reason for this loss of effectiveness resides in the fact that the low density of the porous barrier material quickly causes it to become clogged and filled with dirt, oil, grease, sludge, water, ice and other foreign matter which is ever present in a classification yard milieu. In addition, much of the noise absorption material is susceptible to rapid deterioration by the climatic conditions which exist in a railroad environment. It has been found that the maximum theoretical value of noise reduction by a barrier arrangement is approximately 25 db which is usually insufficient to meet the noise pollution working standards of the Occupational Safety Hazard Act. In addition, many states and local authorities have presently in effect or will shortly enact noise abatement ordinances which limit the noise level that may permeate the border lines of the municipality. It has been found that even at substantial distances, such as, 5,000 feet from the location of the car retarder, the level of the wheel squeal exceeded the maximum possible level of the local noise abatement ordinance.

OBJECTS AND SUMMARY OF THE INVENTION

Accordingly, it is an object of this invention to provide a new and improved noise control arrangement for reducing the wheel squeal produced by a railway car retarder.

Another object of this invention is to provide a novel electronic system for controlling the wheel squealing noises generated by an activated railroad car retarder.

A further object of this invention is to provide a unique noise control system for braking apparatus.

Yet another object of this invention is to provide an electronic control system for mitigating the wheel squealing noise produced by a squeeze-type of railroad car retarder in classification yards.

Yet a further object of this invention is to provide an improved control system for suppressing irritating and injurious sound waves produced by the stick-slip action taking place between the brake shoes and wheels of a railway vehicle by deactivating the railroad car retarder when the sound pressure reaches a predetermined level.

Still another object of this invention is to provide an improved noise reduction control arrangement for a fluidic operated car retarder by monitoring the noise in the vicinity of the retarder and by exhausting the fluid when the noise level exceeds a predetermined value.

Still a further object of this invention is to provide a car retarder control system for deactivating the brake effort when the vibrations of the sound waves approach a wheel squealing level.

An additional object of this invention is to provide a noise control system for braking apparatus having means for converting sound into electrical signals, means for filtering undesirable frequency from the electrical signals, means for rectifying and integrating the electrical signals, means for sensing the magnitude of the integrated signals and for producing an output signal when the magnitude of the integrated signals exceeds a predetermined value, and means responsive to the output signal to deactivate the braking apparatus to mitigate noise pollution.

Yet an additional object of this invention is to provide a noise control system for railroad car retarders which is economical in cost, simple in construction, easy to install, facile to maintain and durable in use.

In the attainment of the foregoing objects there is provided a control system for reducing wheel squealing noises produced by the stick-slip action occurring between the brake shoes and the vehicle wheels of an activated gripping type of railroad car retarder. The control system includes a microphonic pick up transducer conveniently and suitably located in the immediate vicinity of the car retarder. The microphone picks up the sound waves or noise signals in proximity of the car retarder and converts the audible sounds into electrical signals. The converted electrical signals are applied to a band-pass filter network for passing a selected band of frequencies which have a range between approximately 2,000 and 4,000 hertz. The filtered signals are rectified and are applied to an integrating circuit. The integrating circuit produces a time integral output which is applied to the input of an integrated circuit operational amplifier comparator. The comparator produces an output signal when the time integral output exceeds a reference signal level. The output signal drives a transistor power amplifier which in turn momentarily energizes an electromagnetically controlled exhaust valve. The energization of the exhaust valve deactivates the car retarder so that wheel squealing noises will not be produced by the buildup of the stick-slip action occurring between the brake shoes and the passing wheels of the railway car traversing the car retarder.

BRIEF DESCRIPTION OF THE DRAWINGS

Other objects, features and advantages of this invention will become more apparent from the following description of a preferred embodiment when read with reference to the accompanying drawings which form a part of this specification, in which:

FIG. 1 is a view, partially in isometric and partially in block form, of the control system for reducing the production of wheel squealing noises emanating from a railroad car retarder in a classification yard.

FIGS. 2A and 2B illustrate functional graphs which will be useful in describing the operation of the control system of FIG. 1.

In hump-type or inclined railroad classification yards, it is desirable to separate and classify the railway vehicles or cars of an incoming train into other trains in accordance with their next destination. The incoming cars of the arriving trains are pushed over an incline or hump so that the force of gravity moves the cars to the designated class tracks of the classification yard. However, various parameters, such as, weight, rolling resistance, wind and other factors, cause each of the rolling cars to travel down the track at a different speed. In accordance to control the speed of the moving cars in accordance with their rollability and the distance-to-go, suitable braking apparatus is located at appropriate points along the trackway. Normally the braking apparatus takes the form of a railroad car retarder which has brake shoes or braking bars which are pneumatically or hydraulically moved into and out of engagement with the wheels of the passing railway car for controlling the speed thereof. That is, as the car passes through the retarder, the brake shoes close and open to establish the correct leaving speed of the car in accordance with its ultimate destination in the respective class track. It will be appreciated that when a squeeze or grip type of car retarder is closed for a long period of time, very large amplitude vibrations are set up in the passing wheels and the brake shoes. These vibrations cause a squealing sound or screeching noise which is annoying to residents and, in some cases, is injurious and painful to persons in the area. Test results have shown that the most detrimental frequency range lies between approximately 2,000 and 4,000 hertz and that the noise level of the wheel screech reaches 130 db or more at the retarder site.

Referring now to FIG. 1 of the drawings, it will be seen that a railroad car 1 is traveling down the hump or group trackway on its way to a preselected class track in the yard. In hump or group applications, it is common practice to utilize a dual track car retarder to ensure that sufficient braking effort is exerted on the sides of the wheels of the cars as they pass through the retarder. As shown a pair of conventionally supported track rails 2a and 2b form the trackway leading to the various classification tracks. The car retarder generally characterized by numeral 3 includes a pair of braking bars or brake shoes 4a and 4b disposed on opposite sides of running rail 2a and also includes a pair of braking bars or brake shoes 5a and 5b disposed on opposite sides of running rail 2b. In practice the brake shoes are moved in unison between a closed braking position and an opened nonbraking position through a plurality of operating units (not shown). The operating units are disposed at selected spaced points along the length of the brake shoes, and each operating unit includes a pair of pivotal levers and at least one fluidic operated piston and cylinder assembly. The piston and cylinder assemblies cause the levers to close the braking shoes when pressure from a suitable hydraulic or pneumatic source is applied through a suitable intake valve 10 and cause the levers to open the brake shoes when the pressure is relieved through a suitable exhaust valve 11.

As shown in FIG. 1, electronic control apparatus 13 is employed to process certain accumulated information, such as, weight, rolling resistance, entering speed, etc., to normally allow the vehicle or car to leave the retarder 3 at a preselected velocity or speed. In an automatic classification yard, the electronic control apparatus 13 selectively energizes and deenergizes electromagnetic coils 14 and 15 to actuate and deactuate associated fluidic valves 10 and 11 which are connected to the operating units of the car retarder 3 via conduits 12.

As shown, the noise control system of the present invention includes a microphonic pick-up transducing device 16 suitably located in the vicinity of the car retarder area. The electroacoustical microphone or transducer 16 is fixedly mounted adjacent the car retarder 3 to pick up the principal noise or sound waves that are radiated by the stick-slip or grating action that occurs between the engaged surfaces of the brake shoes and wheels of the vehicle. The electroacoustical transducer 16 is responsive to a wide range of pitches or frequencies and intensities so that the picked up sound waves are converted to electric waves. The converted electric waves or signals are applied to the input of a band-pass filter network 17 via lead L1. The band pass filter 17 is a selective circuit which passes a band or range of frequencies and attenuates all other frequencies. In the instant case, the filter 17 has been designed to pass frequencies in the range of approximately 2,000 to 4,000 hertz which have been found to be the most detrimental frequencies produced by wheel squealing noise or sound waves. The output signals for the band-pass filter 17 are connected through diode rectifier D1 to an integrating circuit IC formed by resistor R1 and capacitor C1. A parallel discharge resistor R2 is connected between the upper terminal of capacitor C1 and ground. As shown the upper terminal is connected to a first inverting input terminal I of an appropriate integrated circuit operational amplifier comparator 20. A voltage reference level is established on the second noninverting input terminal NI of the conventional operational amplifier 20 via resistor R3 which is connected to ground. A variable resistor R4 connects the negative supply voltage terminal V− of operational amplifier 20 to grounded resistor R3. The positive supply terminal V+ is connected to a suitable positive voltage source (not shown). The output from the operational amplifier 20 is derived from output terminal 0. As shown, a feedback circuit including a series connected diode D2 and resistor R5 is connected between the output terminal 0 and the noninverting input terminal WI. The feedback produces a given amount of hysteresis or delay which prevents spurious signals from momentarily triggering the operational amplifier when the input signal on terminal I is about to pass through the threshold value of the comparator circuit 20. It will be noted that the output terminal 0 of the comparator 20 is connected to the input of a single stage power amplifier PA via series connected diode D3 and resistor R6. The power amplifier PA includes AN NPN transistor Q1 having a base electrode $b1$, an emitter electrode $e1$ and a collector electrode $c1$. The input signals are applied to base electrode $b1$ of transistor Q1 via diode D3 and resistor R6. The base electrode $b1$ is also connected by biasing resistor R7 to the emitter electrode $e1$ which in turn is grounded. As shown, the collector electrode $c1$ of drive transistor Q1 is connected to one end of the electromagnetic actuating winding 15 of exhaust valve 11. The other end of electromagnetic coil 15 is connected to the previously mentioned control apparatus 13 which includes a suitable source of d.c. operating potential. Thus, the output circuit of the power amplifier PA is in multiple with the control circuit of electronic control apparatus 13 for controlling the electrical condition of the exhaust valve winding 15.

Referring now to FIG. 2A, there is shown a graphic representation indicating the relationship of the braking force versus time of a continuously activated car retarder. It will be noted that the force applied to the wheels of the railway car 3 rises very quickly when fluid pressure is conveyed via valve 10 and conduits 12 to the operating units by the energization of the electromagnetic coil 14 by the electronic control apparatus 13. The time integral represents the amount of energy that is applied by the brake shoes to the car for causing retardation. It has been found that wheel squealing noises are not immediately produced upon the application of the braking force and that a finite period of time expires before audible screeching sounds begin to emanate from an activated car retarder. That is, the energy between times $t_1$ and $t_2$ does not result in wheel squealing noises, but if the braking force continues to be applied by the brake shoes, vibrations are set up in the wheels of the car and extremely loud screeching sounds permeate the area. Thus, an initial nonsqualing buildup period occurs as is shown by the unshaded area under the curve of FIG. 2A. At time $t_2$, the energy becomes sufficient to thereafter cause squealing noises to be produced by the activated car retarder.

Turning now to FIG. 2B, there is shown a graphical illustration of what transpires in a force-time relationship of a manual, semiautomatic or automatic classification yard when it is supplemented by the present invention. When the car retarder 3 is fluidically actuated, the rise time of the braking force is relatively steep, and the force reaches its maximum level at time $t_1$ which is the same time as in FIG. 2A. In viewing FIG. 2B, it will be noted that the braking effort or force will continue to be exerted for a selected period of time, namely, from time $t_1$ to time $t_2$. Since time $t_2$ is the brink of the wheel squealing noise production, it is found that the release of the brake force at this point will cause a dramatic reduction in the energy as shown by the trail edge of the first pulse in FIG. 2B. Since the braking force is quickly terminated at time $t_2$, the energy buildup is prevented from exceeding that which is required to produce wheel squealing noises. As shown the braking force is quickly reapplied so that a maximum level is reached at time $t'_1$. The buildup of energy continues until time $t'_2$ at which time the car retarder is again released by exhausting the pressure through valve 11. If the railway car 1 is still within the confines of the car retarder 3 the pressure reactuates the operating units so that the braking force reaches a maximum level at time $t''_1$. Again at time $t''_2$, the fluid pressure is exhausted so that the given amount of energy is preferably insufficient to cause any wheel squealing sounds.

Referring again to FIG. 1 it will now be described how the control system of the present invention is effective in suppressing wheel squealing noises. Let us assume that the railway car 1 is being retarded by the closed brake shoes as shown in FIG. 1. Under this condition, the braking force is at its maximum value so that the speed of the moving railway car 1 is being effectively reduced as it travels through the retarder 3. It will be appreciated that any noise or sound waves in the vicinity of the retarder are picked up by the microphonic transducer 16 and are converted into electrical signals of corresponding frequencies. As previously mentioned, a band of frequencies between approximately 2,000 and 4,000 hertz are of main concern since this band of frequencies possesses the most pernicious characteristics. Thus, incidental or spurious noise signals picked up and converted by the microphone $1b$ are rejected by the band-pass filter 17. The electrical signals passed by the filter network 17 are rectified by diode D1, and the rectified voltage is integrated by the resistor R1 and capacitor C1. The output signal of the integrating circuit is the time integral of the applied input signal, and hence, when time $t_2$ is reached the car retarder area will resound with vibrational waves which produce electrical signals in the 2,000 to 4,000 hertz range. Thus, the voltage developed across capacitor C1 and applied to the inverted input terminal I of comparator circuit 20 causes a positive going output signal to appear on terminal 0. The positive signal is applied to the base electrode b1 to render the power amplifying transistor Q1 conductive. The conduction of transistor Q1 causes current to flow through the electromagnetic coil 15 which in turn opens the exhaust valve 11. The opening of the exhaust valve 11 causes the loss of fluidic pressure in the operating units which opens the brake shoes and thereby deactivates the car retarder. The deactivation of the braking efforts dramatically reduces the energy, and in turn, the vibrational waves so that the signal of inverting terminal suddenly decreases and causes the transistor Q1 to become nonconductive. The nonconduction of transistor Q1 results in the closure of the exhaust valve 11 and allows pressure to immediately flow through intake valve 10 to close the brake shoes thereby reactivating the car retarder 3. Hence, the braking force immediately rises to its maximum value as indicated by time $t'_1$ in FIG. 2B. When time $t'_2$ arrives the control system will again deactivate the car retarder in the same manner as described above to suppress prolonged wheel squealing noises. This cyclical operation will occur for times $t''_1$ and $t''_2$, etc. for railway car 1 and for any subsequent cars which pass through the car retarder 3 and which have a tendency to cause wheel squealing or screeching noises. Thus, the control system of the present invention efficiently and effectively reduces the production of irritating and injurious noises that are normally generated by a railroad car retarder in a calssification yard.

It is apparent that numerous changes, alterations and modifications may be made in the above described construction and apparatus without departing from the spirit and scope of the invention, and therefore it is intended that all the subject matter contained in the foregoing description or shown in the accompanying drawings shall be interpreted as illustrative and not in a limiting sense.

Having now described the invention what I claim as new and desire to secure by Letters Patent, is:

1. A system for controlling wheel squealing noises produced by an activated railroad car retarder comprising, transducer means located in the vicinity of the car retarder for producing electrical signals in response to sound waves, filter means coupled to said transducer means for passing a selected range of frequencies of said electrical signals, rectifier-integrator means coupled to said filtering means for sensing the time integral of said filtered electrical signals, comparator means connected to said integrator means for producing an output signal when the time integral exceeds a given value, and output means coupled to comparator means and responsive to said output signal for deactivating the car retarder thereby suppressing wheel squealing noises.

2. The system for controlling wheel squealing noises produced by an activated railroad car retarder as defined in claim 1, wherein said transducer means is a microphone.

3. The system for controlling wheel squealing noises produced by an activated railroad car retarder as defined in claim 1, wherein said filtering means is a bandpass filter having a range between approximately 2,000 to 4,000 hertz.

4. The system for controlling wheel squealing noises produced by an actuated railroad car retarder as defined in claim 1, wherein said integrator means includes a resistance-capacitance network.

5. The system for controlling wheel squealing noises produced by an activated railroad car retarder as defined in claim 1, wherein said comparator means includes an operational amplifier having hysteresis.

6. The system for controlling wheel squealing noises produced by an activated railroad car retarder as defined in claim 1, wherein said output means includes a power amplifier.

7. The system for controlling wheel squealing noises produced by an activated railroad car retarder as defined in claim 6, wherein said power amplifier includes a semiconductive device.

8. The system for controlling wheel squealing noises produced by an activated railroad car retarder as defined in claim 6, wherein said power amplifier includes an NPN transistor having its input coupled to said comparator means and having its output coupled to control means of the railroad car retarder.

9. The system for controlling wheel squealing noises produced by an activated railroad car retarder as defined in claim 8, wherein said control means is an electromagnetic exhaust valve for releasing the braking effort on the wheels by the railroad car retarder.

10. The system for controlling wheel squealing noises produced by an activated railroad car retarder as defined in claim 9, wherein electromagnetic exhaust valve is energized by the conduction of said NPN transistor to deactivate the railroad car retarder.

11. A noise control system for braking apparatus comprising, means for converting sound into electrical waves, means for filtering undesirable frequencies from said electrical waves, means for rectifying and integrating said electrical waves, means for sensing the magnitude of said integrated electrical waves and for producing an output signal when the magnitude of said integrated electrical waves exceeds a predetermined value, and means responsive to said output signal to deactivate the braking apparatus to mitigate noise pollution.

* * * * *